United States Patent [19]

Woods et al.

[11] 4,186,939
[45] Feb. 5, 1980

[54] ELECTRO-MECHANICAL DOCKING APPARATUS AND METHOD

[76] Inventors: Leslie A. Woods, 24021 Mill Valley Rd., Valencia, Calif. 91355; Christopher Van Peski, 5386 Jed Smith Rd., Hidden Hills, Calif. 91302

[21] Appl. No.: 935,488
[22] Filed: Aug. 21, 1978
[51] Int. Cl.$^2$ .............................................. B60D 1/16
[52] U.S. Cl. ................................ 280/477; 340/52 R; 340/686
[58] Field of Search .............. 280/477; 340/52 R, 686

[56] References Cited

U.S. PATENT DOCUMENTS

| Re. 28,590 | 10/1975 | Salmi | 280/477 |
| 3,858,966 | 1/1975 | Lowell, Jr. | 280/477 |
| 4,030,775 | 6/1977 | Hill | 280/477 |

Primary Examiner—Joseph F. Peters, Jr.
Assistant Examiner—Donn McGiehan
Attorney, Agent, or Firm—Romney, Schaap, Golant, Disner & Ashen

[57] ABSTRACT

An electro-mechanical apparatus for mating two complementary objects comprising yaw and distance monitoring means, cable means for connecting said first and second objects and display means for indicating the relative yaw and distance between said objects.

A method for docking two complementary objects comprising the steps of: determining the yaw and distance between said objects; monitoring the relative yaw and distance; repositioning one or both of the objects so as to minimize the yaw and distance between the objects.

19 Claims, 5 Drawing Figures

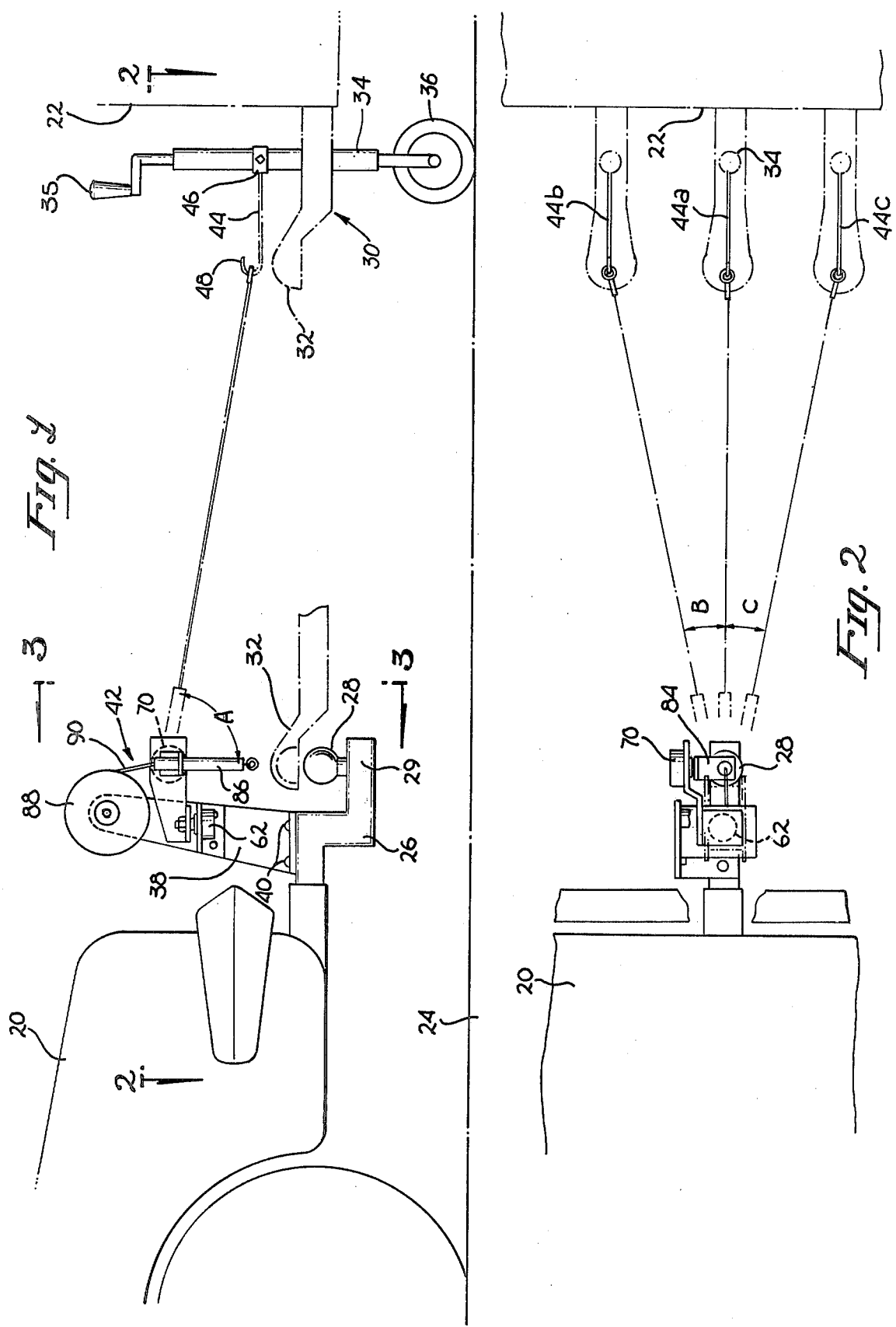

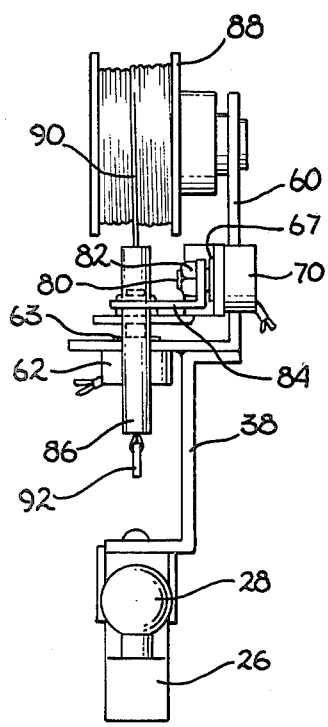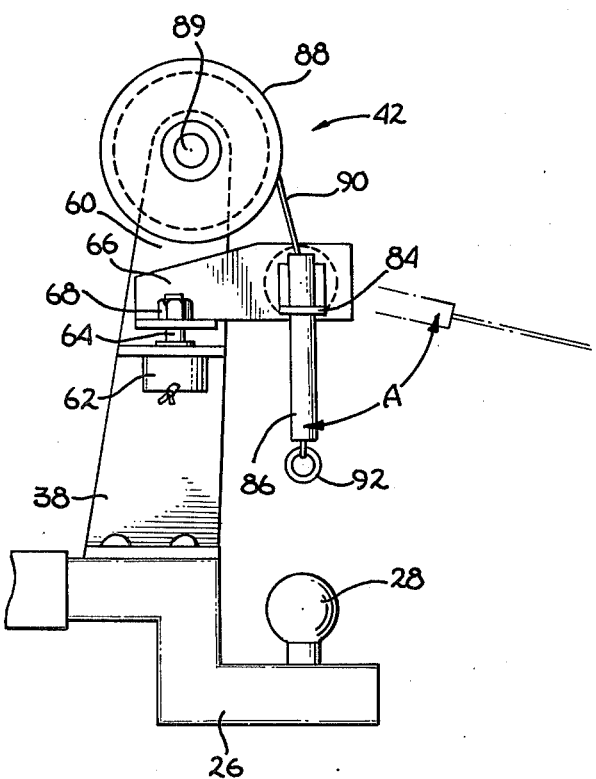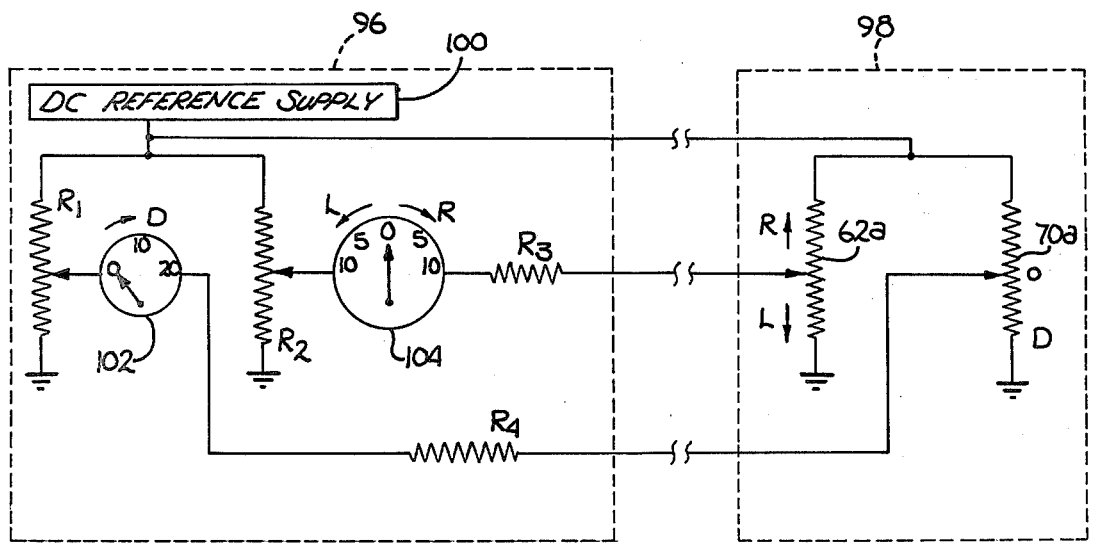
Fig. 3
Fig. 4
Fig. 5

ELECTRO-MECHANICAL DOCKING APPARATUS AND METHOD

BACKGROUND OF THE INVENTION

1. Field of the Invention

The present invention relates to electro-mechanical systems and more particularly, to an apparatus and method for docking, that is, joining a first object with a complementary object, when the docking process is not visible to the person controlling the relative positions of the objects, although the invention may be utilized in situations wherein the docking process is controlled by automated means. Specifically, the invention relates to an apparatus which aids the operator of a motor vehicle in docking the ball of a vehicle hitch attached to the rear of a tow vehicle with the complementary portion of a trailer hitch, known as the socket, attached to the front of the vehicle to be towed, without the need of the operator viewing the respective trailer hitches.

2. Description of the Prior Art

It can be easily seen that if a person wishes to attach a tow vehicle to a trailer, it will be extremely difficult as the vehicle hitch and the trailer hitch will be out of view of the operator of the tow vehicle during the docking process. This is so because the vehicle hitch is located at the lower rear portion of the tow vehicle and cannot be seen by the operator of the vehicle under normal conditions.

In the absence of any device to aid in the docking process, the user is required to obtain the assistance of another person to guide him in mating the ball of the vehicle hitch with the socket of the trailer hitch.

The only product on the market which is presently known to the inventors and which is designed to aid the operator of the vehicle in docking without the necessity of assisting the aid of another person comprises two metal antenna like rods. One rod is removably mounted to the trailer hitch at or in the vicinity of the socket and the other rod is removably mounted to the ball of the vehicle hitch. The operator of the vehicle, while backing towards the trailer will attempt to successfully dock by visually attempting to superimpose the two rods. The docking process is completed when the rod attached to the ball is seen to bend as it comes into contact with the socket portion of the trailer hitch.

The prior art device suffers from the limitation that it is extremely difficult to judge the distance and angle between the respective rods and thus docking becomes quite frustrating and at times quite dangerous. Also the rods are at times difficult to see especially at night when they are not illuminated by sunlight. Also, another disadvantage of the prior art is that such a device is not useable when the rear of the vehicle cannot be seen by the operator such as when the vehicle is a pick-up truck with a camper shell seated in the truck bed.

As is readily apparent, it is quite inefficient to require two people to be involved in the docking process and there are times when it can be seen that there will not be a second person available to assist the operator of the vehicle in the process. Additionally, there is the possibility that the vehicle operator will misinterpret the instructions of the person giving directions or that the directions will be incorrect or ambigious.

What is presently needed is a system which will overcome these disadvantages present in the prior art.

SUMMARY AND OBJECTS OF THE INVENTION

The above-mentioned problems in the prior art have been overcome by the present invention which overcomes the stated disadvantages. The present invention is an electro-mechanical device which is capable of permitting an operator of a vehicle to quickly and easily dock the ball of the vehicle hitch with the socket of the trailer hitch without aid or assistance from another person whether the docking process is attempted at night or in daylight.

A general object of the invention is to provide a commercially feasible method of docking two complementary objects in a relatively short period of time when the objects are not in the operator's view.

A primary object of the invention is to provide a docking assistance mechanism which is simply constructed and economical to produce.

Yet another object of the invention is to provide a docking system which is reliable and may be used by those having no technical background.

Other objects and advantages of the invention will appear from the following description taken in conjunction with the accompanying drawings.

BRIEF DESCRIPTION OF THE DRAWINGS

FIG. 1 is a front elevational view of a preferred embodiment of my docking assistance mechanism shown in conjunction with the rear portion of a tow vehicle and a trailer;

FIG. 2 is a cross-sectional view taken along line 2—2 of FIG. 1;

FIG. 3 is an enlarged right side elevational view of the distance and angle sensing unit portion of my invention attached to a vehicle hitch;

FIG. 4 is an enlarged front-elevational view of the distance and angle sensing unit of my invention; and, FIG. 5 is a schematic diagram showing the electronics portion of my invention.

DESCRIPTION OF THE PREFERRED EMBODIMENT

While the present invention is susceptible to modifications and alternative constructions, an illustrative embodiment is shown in the drawings and will be described in detail hereinbelow. It should be understood, however, that it is not the intention to limit the invention to the particular form disclosed; but on the contrary, the intention is to cover all modifications, equivalents and alternative constructions falling within the spirit and scope of the invention as expressed in the appended claims.

Referring initially to FIG. 1, there is shown therein a tow vehicle 20 and a trailer 22 upon base 24.

A standard vehicle hitch 26 is shown attached to the tow vehicle 20. The vehicle hitch 26 is attached to the frame of the tow vehicle in a manner well known to those having ordinary skill in the area. The vehicle hitch comprises a ball portion 28 and a tongue portion 29.

Similarly, attached to the trailer is a trailer hitch 30 having a tongue portion 33 and a socket portion 32. The socket portion 32 is of such a configuration that there is an interior cavity in the bottom side thereof for receiving the ball portion 28 of the vehicle hitch 26. The socket portion 32 and the ball portion 28 are of such a design that they comprise complementary mating units.

A supporting leg 34 affixed to a wheel 36 is shown connected in the usual manner to and supporting the trailer when the trailer hitch is not coupled to the tow hitch. The support leg 34 and wheel 36 keep the socket portion of the trailer hitch from coming into contact with the ground when the socket portion of the trailer hitch and the ball portion of the vehicle hitch are not engaged. The support leg has a crank 35 which is operably connected to an internal mechanism (not shown) for vertically positioning the trailer hitch relative to the base 24.

Attached to the support leg 34 by means of a clamp 46 is a guide member 44 having a C shaped end 48. The guide member is aligned so that the C shaped portion is located near the socket portion of the trailer hitch.

Attached to the vehicle hitch by means of bolts 40 is a support arm 38. A distance and angle sensing unit 42 is affixed to the support arm 38 at an elevation higher than the ball portion of the vehicle hitch.

Referring now to FIGS. 3 and 4 collectively there is shown a distance and angle sensing unit 42 attached to the vehicle hitch 26 by means of a support arm 38. The distance and angle sensing unit comprises a yaw potentiometer 62, an L bracket 60, a pitch bracket 66, a pitch potentiometer 70, a follower bracket 84, a hollow follower tube 86, a spring loaded reel 88, a cable 90 and a cable ring 92.

Attached to the support arm 38 is the horizontal leg of the L bracket 60. The yaw potentiometer 62 which comprises a yaw sensing means, is attached to the horizontal leg of the L bracket so that the shaft 64 may rotate independently of the horizontal leg of the L bracket. The yaw potentiometer is fastened to the L bracket by means of a nut 63 in a manner well known to those having ordinary skill in the art.

The shaft 64 of the yaw potentiometer is attached to the pitch bracket by means of a nut 68 in a conventional manner well known to those skilled in the art so that as the pitch bracket rotates about the longitudinal axis of the shaft 64 of the yaw potentiometer, the shaft of the yaw potentiometer rotates a corresponding amount.

The pitch potentiometer 70 which comprises a pitch sensing means, is affixed to the pitch bracket 66 by means of a nut 67 in a manner well known to those skilled in the art so that the shaft of the pitch potentiometer extends through the pitch bracket.

The follower bracket 84 is attached to the shaft 80 of the pitch potentiometer 70 by means of a nut 82 so that as the pitch bracket rotates about the longitudinal axis of the shaft 80 of the pitch potentiometer 70, the shaft 80 will rotate a corresponding amount.

The hollow follower tube 86 which comprises a follower means is rigidly affixed to the follower bracket 84.

When the follower tube is in the rest position (which is described in detail below) it points downwardly towards the ball portion of the vehicle hitch.

A spring loaded reel 88 which rotates about an axle 89 is attached to the vertical leg of the L bracket. A cable 90 having a predetermined length is wound around the reel 88. The free end of the cable passes through the hollow follower tube and is fastened to a cable ring 92. The spring loaded reel comprises a cable dispensing means. The cable is wound around the reel in such a manner that when the cable ring is suspended immediately below the follower tube there is no force rewinding the cable. This is known as the rest position. However, if the cable ring is pulled away from the follower tube, the spring loaded reel will attempt to rewind the cable, thus it will be seen that there will be tension in the cable when it is not in the rest position. The cable will then cause the hollow follower tube to point towards the cable ring.

Next referring to FIG. 5, there is shown a schematic diagram of the electronic portion of my apparatus. The electronic portion comprises an interior read-out package 96, located, in the preferred embodiment, within the tow vehicle 20 and an exterior package 98 located, in the preferred embodiment, in the sensing unit 42, which are electronically coupled. In the preferred embodiment, the electronic coupling is performed by means of wires. However, it will be understood that in a different embodiment the coupling may be by means of radio waves or the like.

Within the interior read-out package 96 is located a DC reference power supply 100, a distance meter 102, an angle meter 104, reference potentiometer R1 and R2 and fixed safety resistors R3 and R4.

The reference potentiometers R1 and R2 are connected in parallel across the DC reference power supply 100.

Distance meter 102 is a standard voltmeter which has a scale of 0 to a prdetermined voltage. Angle meter 104 is also a voltmeter but 0 volts is the center of its scale and the angle meter is capable of indicating a voltage continuously from a predetermined negative voltage to a predetermined positive voltage.

The central elements of reference potentiometer R1 and R2 are connected to distance meter 102 and angle meter 104, respectively. The remaining terminal of distance meter 102 is connected to safety resistor R4. Similarly, the remaining terminal of angle meter 104 is connected to safety resistor R3.

Located within the external package are yaw potentiometer 62 A and pitch potentiometer 70 A (corresponding to 62 and 70 of FIGS. 3 and 4).

The yaw and pitch potentiometers 62 and 70 are connected in parallel across the DC reference power supply.

The central element of the yaw potentiometer 62a is connected to the angle meter 104 through the safety resistor R3 and the central element of the pitch potentiometer 70a is connected to the distance meter 102 through the safety resistor R4.

Referring to all the figures, the method of operating the invention will be described in detail.

When the invention is first assembled, the following initial adjustments are made.

The guide member 44 is attached to the leg by means of the clamp 46 so that the C shaped portion 48 is positioned near the socket 32 of the trailer hitch. The socket of the trailer hitch is then mated with the ball of the vehicle hitch. The cable ring is then positioned so that it engages the C-shaped end of the guide member. Potentiometers R1 and R2 are then adjusted so that meters 102 and 104, respectively, read "0." This is an adjustment which need be made only once provided the sensing unit and the guide member are retained in this position when docking occurs in the future. As will be seen, if such is the case, meters 102 and 104 will both read "0" when the ball and socket are mated in the future.

In the future, if the operator of the vehicle wishes to dock the ball and socket of the vehicle and trailer hitches, respectively, with the aid of our invention, he need only perform the following procedure.

The rear portion of the vehicle is positioned near the trailer hitch.

The cable ring is then attached to the C-shaped end of the guide member 44 thus causing the follower tube to form an angle A with the verticle. (See FIGS. 1 and 4). The follower tube forms the angle A with the verticle because the spring loaded reel causes the cable to be taut. The longitudinal axis of the follower tube when extended beyond the end of the follower tube will intersect the cable ring.

As can be seen, the angle A is dependent on the horizontal distance between the ball of the vehicle hitch and the C-shaped end of the guide member 44. As can be seen, when the C-shaped end of the guide member is displaced a substantial distance from the vicinity of the ball portion of the vehicle hitch 26, the angle A approaches $\pi/2$ radians and decreases as the ball nears the socket.

As can be seen in FIG. 2, when the cable ring is hooked to the C-shaped portion of the guide member 44a the longitudinal axis of the guide member is coincident with the longitudinal axis of the tow vehicle, and the follower tube extends to the rear of the tow vehicle and its longitudinal axis is coincident with the longitudinal axis of the tow vehicle.

The location of the guide member 44b causes the follower tube to form an angle B with the longitudinal axis of the tow vehicle and consequently causes the shaft of the yaw potentiometer to rotate B radians.

When the cable ring 92 is attached to the C-shaped portion of guide member 44 C, the follower tube makes an angle C with the longitudinal axis of the tow vehicle, thus causing the shaft of the yaw potentiometer to rotate C radians.

As the shafts of the yaw and pitch potentiometers are rotated, the voltage potentials sensed by the distance and angle meters 102 and 104, respectively, change thus causing the meter needles to indicate the new voltage potential.

The operator of the tow vehicle observes the deflection of the distance and angle meters and operates the tow vehicle so as to zero both meters. The angle meter is connected so that if the trailer is to the passenger side of the tow vehicle, the needle of the angle meter will deflect towards the right. Such a deflection directs the operator to turn the steering wheel to the right (i.e., clockwise). The operator thus turns the steering wheel to the right and moves the tow vehicle backward until the needle is zeroed. Thereupon, the operator straightens the tires so that the tow vehicle will move directly backwards and attempts to keep the angle meter zeroed at all times while backing the vehicle.

The operator is aware of the distance of the ball portion of the vehicle hitch from the socket portion of the trailer hitch due to the fact that the reading indicated by the distance meter is proportional to the distance between them. As the reading on the distance meter approaches zero, the operator is informed that the ball portion of the vehicle hitch is nearing the socket portion of the trailer hitch. When the ball portion of the vehicle hitch is immediately below the socket portion of the trailer hitch, the pitch and yaw potentiometers are returned to the positions wherein the voltage potential across the meters 102 and 104 are zero volts and consequently the reading of the meters is also "0." To complete the docking process, the crank 34 is rotated so that the height of the socket portion of the trailer hitch is lowered so that it mates with the ball portion of the vehicle hitch.

Resistors R3 and R4 are safety resistors to limit the current through the meters.

While one embodiment of my invention has been shown, it can be seen that the invention is adaptable to other designs. For example, it will be observed that while in the preferred embodiment the information is relayed to and observed by the operator in analogue form, it can be seen that through the adaptation of my invention with encoders and decoders and digital electronics, the distance and angle information may be observed by the operator in digital form. Also while I have shown the sensing unit 42 attached to the support arm, the sensing unit may be attached to the trailer hitch and a guide member may be attached to the vehicle hitch.

As can be seen, my invention is useful and efficient not only for docking a vehicle hitch with a trailer hitch, but also may conveniently be used to dock or position other types of objects when the person performing the docking procedure cannot observe the actual mating of the objects.

Clearly what has been shown in a new, unique, novel and inexpensive method of permitting a single person to dock complementary objects when the docking operator cannot observe the docking process.

We claim:

1. An apparatus for positioning a first object relative to a second object, comprising:
   angle sensing means attached to the first object for measuring the angular displacement between a predetermined axis of the first object and the straight line defined by the shortest distance between predetermined points on the first and second objects;
   distance sensing means attached to the first object for measuring the distance between predetermined points on the first and second objects, said distance sensing means comprising a pitch potentiometer means;
   predetermined points on the first and second objects which define a straight line between the objects established by those predetermined points;
   a C-shaped member attached to said second object at one of said predetermined points;
   cable means attached to said C-shaped member and to one of the predetermined points on said first object;
   tension means attached to the first object for keeping the cable means taut;
   follower tube means surrounding a portion of the cable means for coupling the angle sensing means and the distance sensing means with the cable means; and
   said pitch potentiometer means being coupled to said follower tube means for providing a variable resistance which is dependent upon the relative distance between the first and second objects.

2. The apparatus of claim 1 wherein the angle sensing means comprises yaw potentiometer means coupled to the follower tube means for providing a variable resistance dependent upon the relative angular displacement between the objects.

3. The apparatus of claim 2 including reel means attached to the first body and coupled to the tension means for winding a portion of the cable means thereabout.

4. The apparatus of claim 3 including display means electronically connected to the distance and angle sensing means for visually representing the relative position of the objects.

5. An apparatus for mating a first object having a predetermined axis with a second object, comprising:
   housing means attached to the first object;
   yaw sensing means mounted to the housing means for sensing the yaw angle between the predetermined axis of the first object and a straight line defined by predetermined points on the first and second object;
   bracket means coupled to the yaw sensing means capable of being revolved around the yaw sensing means;
   pitch sensing means attached to the bracket means for sensing the distance between predetermined points on the first and second objects;
   reel means revolvably mounted to the housing means and capable of storing a cable;
   cable means attached to the reel means for attachment to the predetermined point of the second object;
   tension means operably connected to the reel means for keeping the cable means taut;
   follower tube means rotatably connected to the pitch sensing means and surrounding a portion of the cable means for coupling directional information from the cable means to the pitch and yaw sensing means.

6. The apparatus of claim 5 wherein the angle sensing means comprises first potentiometer means mounted to the housing means and operably connected to the bracket means for providing a variable resistance dependant upon the yaw angle, and the pitch sensing means comprises second potentiometer means mounted to the bracket means and operably connected to the follower tube means for providing a resistance dependant upon the distance between predetermined points on the objects.

7. The apparatus of claim 6 including electronic display means electronically connected to the first and second potentiometer means for providing indicia corresponding to the relative position of the predetermined points on the objects.

8. The apparatus of claim 7 including retention means attached to the second object for affixing the cable means to the second object.

9. A method of docking a first object having a predetermined axis with a second object comprising the steps of placing a lanyard between predetermined points of the first and second objects for providing relative position information;
   sensing the angle between the predetermined axis of the first object and the straight line defined by the predetermined points on the objects;
   moving a follower member with the lanyard and forming an angle in a generally vertical plane with respect to said straight line;
   sensing the angle in the vertical plane defined by the lanyard follower member and the straight line and thereby determining the distance between the predetermined points on the objects as a function of said angle;
   repositioning the first object relative to the second object so as to minimize the difference between the angle sensed and a predetermined angle;
   repositioning the first object relative to the second object so as to minimize the difference between the distance between the predetermined points on the objects and a predetermined distance.

10. The method of claim 9 wherein the steps of sensing the angle between the predetermined axis of the first object and the straight line defined by the predetermined points on the objects and sensing the distance between the predetermined points on the objects are done simultaneously.

11. The method of claim 10 including the step of displaying indicia dependent upon the position of the predetermined point on the first object relative to the predetermined point on the second object.

12. The method of claim 11 wherein the steps of repositioning the first object relative to the second object to minimize the difference between the angle sensed and a predetermined angle and repositioning the first object relative to the second object so as to minimize the difference between the distance between the predetermined points on the objects and a predetermined distance are done simultaneously.

13. The method of claim 12 including the step of tensing the lanyard when it becomes slack.

14. An apparatus for aiding an operator in moving one of a first movable object or a second movable object with respect to each other along a straight line representing the shortest path of movement and enabling docking of said objects, said apparatus comprising:
   a housing attachable to one of said objects;
   yaw sensing means operatively mounted on said housing for sensing a yaw angle defined by an axis of the first object relative to the second object and the straight line;
   mounting means operatively associated with said yaw sensing means and capable of being angularly movable relative to said yaw sensing means;
   pitch sensing means operatively attached to said mounting means for sensing the distance between the first and second objects;
   cable dispensing means operatively associated with said housing for dispensing a cable under tension so that the cable may be attached between the first and second objects at points so that the cable would be parallel to the shortest path of movement when one of the objects is moved toward the other along the line representing the shortest path of movement, said cable being movable through a plane and forming an angle with respect to said straight line in response to the distance between said two objects; and
   follower means operatively mounted with respect to one of said sensing means and being movable with the cable and following the angular movement of said cable in said plane for coupling directional information from the cable to the pitch sensing means and the yaw means.

15. The apparatus of claim 14 further characterized in that the yaw sensing means and the pitch sensing means are both electrically operable sensing means which generate electrical sensing signals.

16. The apparatus of claim 14 further characterized in that said mounting means is rotatable relative to said yaw sensing means.

17. The apparatus of claim 14 wherein the yaw sensing means comprises first potentiometer means mounted to the housing and operably connected to a bracket on said housing for providing a variable resistance dependant upon the yaw angle, and the pitch sensing means comprises second potentiometer means mounted to the bracket and operably connected to the follower means for providing a resistance dependant upon the distance between predetermined points on the objects.

18. The apparatus of claim 14 further characterized in that said plane is a generally vertically disposed plane.

19. An apparatus for aiding an operator in moving one of a first movable object or a second movable object with respect to each other along a straight line representing the shortest path of movement and enabling docking of said objects, said apparatus comprising:

a housing attachable to one of said objects;

a yaw sensing potentiometer operatively mounted on said housing for sensing a yaw angle defined by an axis of the first object relative to the second object and the straight line and generating an electrical signal in response to and proportional to said yaw angle;

mounting means operatively associated with said yaw sensing potentiometer and capable of being angularly movable relative to said yaw sensing means;

a pitch sensing potentiometer operatively attached to said mounting means for sensing the distance between the first and second objects and generating an electrical signal in response to and proportional to said pitch angle;

cable dispensing means operatively associated with said housing for dispensing a cable under tension so that the cable may be attached between the first and second objects at points so that the cable would be parallel to the shortest path of movement where one of the objects is moved toward the other along the line representing the shortest path of movement, said cable being movable through a plane and forming an angle with respect to said straight line in response to the distance between said two objects; and means following the movement of said cable and being operatively coupled to at least said pitch sensing potentiometer to enable the electrical signal generated by said pitch sensing potentiometer representing distance as a function of said signal.

* * * * *